Dec. 13, 1938.   W. O. LUM   2,140,389
ZONE HEATING
Filed Feb. 16, 1935   2 Sheets-Sheet 1
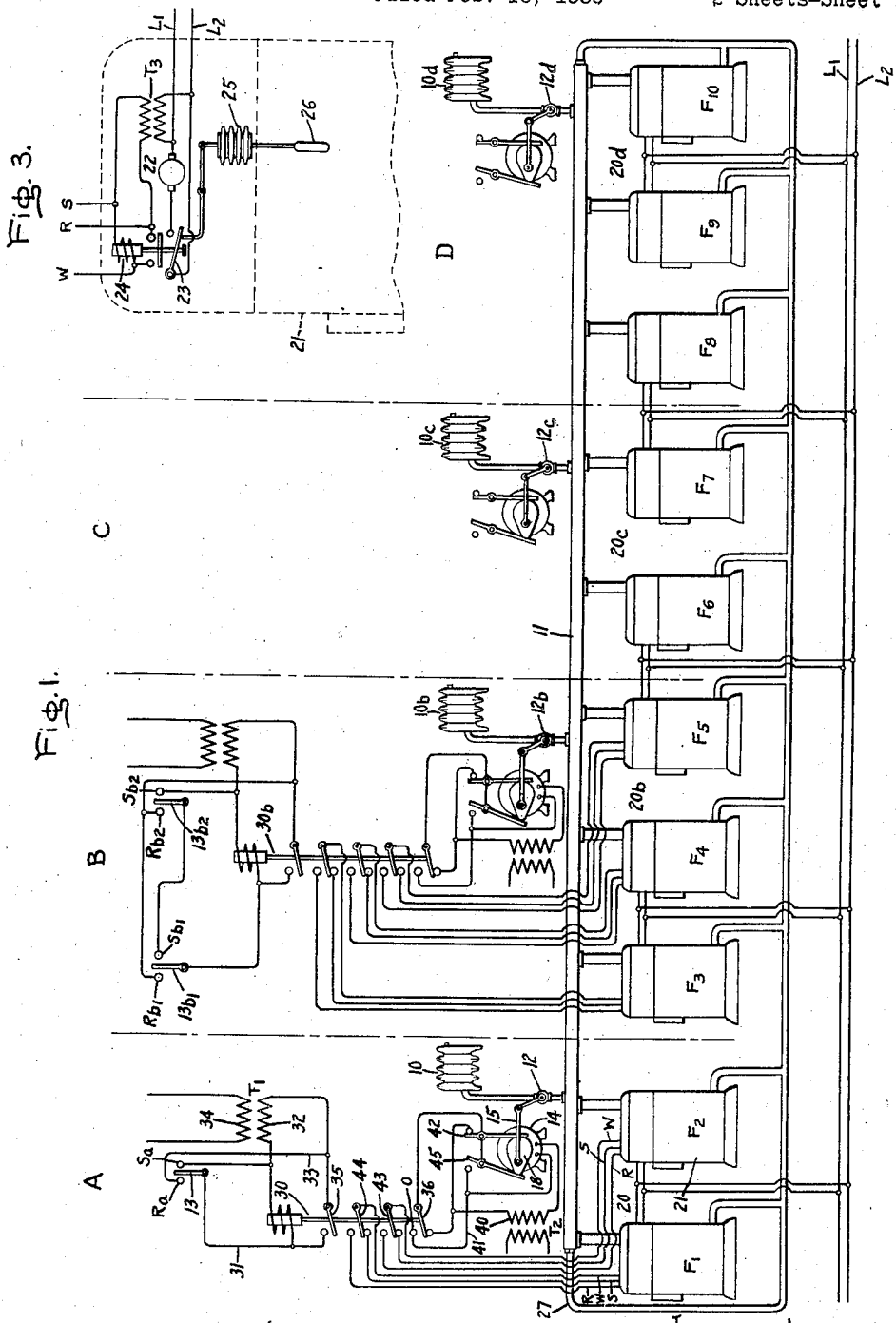
Inventor:
Walter O. Lum,
by Harry E. Dunham
His Attorney

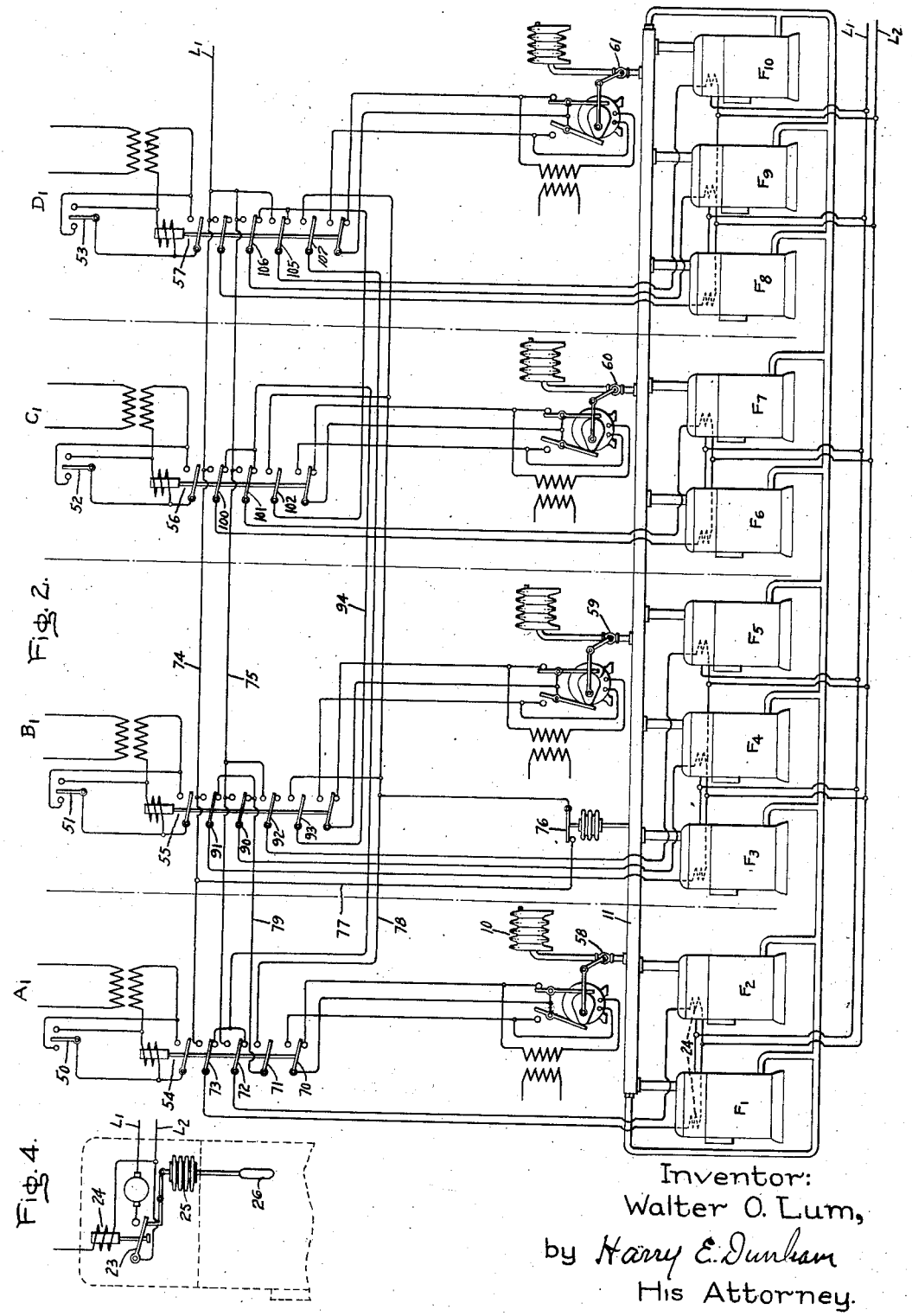

Patented Dec. 13, 1938

2,140,389

UNITED STATES PATENT OFFICE 2,140,389

ZONE HEATING

Walter O. Lum, Schenectady, N. Y., assignor to General Electric Company, a corporation of New York Application February 16, 1935, Serial No. 6,916

2 Claims. (Cl. 237—2)

The invention relates to zone temperature control systems and provides improved systems and apparatus for maintaining predetermined temperature conditions in each of a plurality of zones under thermostatic control. The improvements of the present invention may be used with advantage in any zone heating system employing a heating medium such as steam, vapor, hot water, hot air, or the like, and a plurality of separately operable heat generators for heating the medium although not necessarily limited thereto. It will be obvious from the ensuing description that my invention is applicable not only to multiple zone heating systems but to all multiple zone systems that are to be maintained at predetermined temperature conditions.

The principal object is to combine the heat transfer medium temperature changing and distributing equipments for a plurality of zones each operable under separate zone thermostatic control so as to render the temperature changing equipment for any zone capable of supplying heat transfer medium to the distributing equipment for any other zone.

In the improved combination, the temperature changing equipment for each zone automatically serves as a standby for the temperature changing equipment for every other zone. Thus in case of failure of the temperature changing equipment for any zone, a supply of heat transfer medium for that zone is insured as long as the equipment for any other zone is operating. Also when the thermostatic control for any zone calls for heat during operation of the temperature changing equipment for any other zone a quick response is at once obtained due to the immediate supply of heat transfer medium from the temperature changing equipment already in operation. Furthermore, with the improved combination of the present invention, the temperature changing duty is distributed substantially uniformly over all of the zone temperature changing equipments substantially in accordance with the requirements of the several zones.

A specific object is to provide a common supply header for the zone conduit or piping systems for the heat transfer medium as well as a common return for the medium to the separate zone temperature changing equipments. In steam or vapor heating systems this simplifies the installation and maintenance and also insures the proper water level in the plurality of boiler furnaces for the different zones.

A further specific object is to enable the thermostatic control of each zone to start the temperature changing equipment of another zone into operation under certain operating conditions. Thus, under minimum steam pressure or temperature conditions, or the like, all or a part of the temperature changing equipment of another zone may be started into operation simultaneously with that of any zone calling for heat transfer medium to insure an adequate and quick supply of medium.

In the accompanying drawings, Figs. 1 and 2 show diagrammatically preferred embodiments of the invention in single pipe multiple zone steam heating systems each employing a plurality of electrically controlled oil fired boiler furnaces. In Fig. 1 the steam generating and steam distributing equipment for each zone is under separate zone thermostat control while in Fig. 2 provision is made for enabling the thermostat control for the heat generating and distributing equipment of each zone also to control all or a part of the heat generating equipment of another zone under certain predetermined conditions, such for example, as abnormally low steam pressures in the common steam main from which the radiator systems of the several zones are supplied. Fig. 3 shows diagrammatically the three wire oil burner circuit control arrangement for each of the boiler furnaces of Fig. 1. Fig. 4 is a similar diagram for the two wire circuit control of Fig. 2.

As shown in Fig. 1 the single pipe steam heating system has four zones indicated as A, B, C, and D. Each zone is provided with a suitable radiator system 10b, 10c, 10d all of which are equipped with suitable vent valves and supplied with steam from the common steam main 11. In zone A the admission of steam from the steam main 11 to the radiator 10 is controlled by the electric motor operated steam distribution valve 12. Similar valves 12b, 12c and 12d are provided for each of the other zones.

The electric motor operated steam valve 12 is opened and closed under the control of the thermostatic switch 13 which is responsive to the temperature of zone A. While not shown in detail, it will be understood that the steam admission valves of the other zones are similarly controlled. The valve 12 is operated by the motor 14 through the agency of the crank arm 15, The limit switch mechanism 18 serves to deenergize the motor 14 when the valve 12 is fully opened and fully closed. It will be understood that other well known forms of electrically controlled valves may be employed, if desired.

In order to take care of the normal heating requirements of zone A, the automatic heat generating equipment 20 is provided for operation under the control of thermostat 13. In the preferred form shown the heat generating equipment 20 consists of two electrically controlled oil fired boiler furnaces $F_1$ and $F_2$ each of which is connected to supply steam to the steam main 11. Each boiler furnace is shown diagrammatically as of the improved type described and claimed in the copending application of Henry S. Woodruff, Serial No. 676,651, filed June 20, 1933, and assigned to the assignee of my present invention. It will be understood, however, that the improvements of the present invention are not limited in any way to the particular type of automatic heat generator shown.

As indicated in the drawings, the heat generating equipments $20_b$ and $20_d$ for zones B and D are of somewhat larger capacity than the heat generating equipments 20 and $20_c$ for zones A and C, three boiler furnaces being provided for each of the zones B and D. All of the boiler furnaces $F_1$ to $F_{10}$ are connected to supply steam to main 11 and to receive condensate return from the common return pipe 27 thereby insuring that a common water level is automatically maintained in all of the boilers.

As shown diagrammatically in Fig. 3, each of the boiler furnaces of Fig. 1 is provided with a suitable automatic electric motor driven oil burner mechanism 22, preferably of the improved type disclosed and claimed in my copending application, Serial No. 737,063, filed July 26, 1934, although any other form of oil burner mechanism may be employed if desired. It will be understood that the oil burner mechanism when energized automatically establishes combustion in the boiler furnace and when deenergized automatically stops the combustion. As shown diagrammaticaly in Fig. 3, the oil burner mechanism 22 is energized when the switch 23 is closed. The closure and the opening of switch 23 is jointly controlled by the operating electromagnet 24 and the boiler thermostat 25.

The boiler thermostat 25 is shown as of the bellows type having the bulb 26 immersed in the water in the boiler furnace so as to be responsive to the temperature thereof. The operating electromagnet 24 is energized from the transformer $T_3$ when a circuit is completed between the control conductors W and R and is deenergized when the circuit is completed between the conductors W and S. The boiler thermostat 25 serves to operate switch 23 to start and stop the oil burner mechanism so as to maintain the boiler water just below the boiling temperature. When the control electromagnet 24 is maintained energized, the oil burner is operated to raise steam in the boiler. The electric motor driven oil burner mechanism and control for each of the furnaces $F_1$ to $F_{10}$ is energized from the alternating current supply lines $L_1$, $L_2$. One form of electric oil burner control apparatus suitable for each of the oil furnaces $F_1$ to $F_{10}$ is disclosed and claimed in the copending application Serial No. 735,103 of John Eaton, filed July 14, 1934 and assigned to the assignee of my present invention.

As indicated diagrammatically in Figs. 1 and 3 each of the automatic oil burner controls is of the well known three-wire type having a run circuit connection R and a stop circuit connection S and an intermediate circuit connection W, although the present invention is not limited in this respect as a two-wire type of automatic oil burner control may also be used.

In the operation of the zone heating system shown in Fig. 1 whenever the temperature in zone A decreases below the value which the zone thermostatic switch 13 is set to maintain, the blade of the zone thermostat engages with its run contact $R_a$. This energizes the master electromagnetic control switch 30, the circuit extending through conductor 31, the winding of switch 30, the secondary winding 32 of the transformer $T_1$, and conductor 33. It will be understood that the primary winding 34 of transformer $T_1$ is maintained energized from a suitable source of alternating current. Upon the closure of electromagnetic switch 30, contact 35 closes to maintain the winding of switch 30 energized through a holding circuit from the transformer secondary winding 32 independent of the energizing circuit through the thermostat 13, thereby preventing chattering.

When the contact 36 of electromagnetic switch 30 engages with its upper cooperating contact O, a circuit is established for energizing the valve control motor 14 to effect operation thereof to open the valve 12, this circuit being traced from the secondary winding 40 of the transformer $T_2$ through the motor 14, conductor 41, contact 36 in its upper position and the closed limit switch 42 to the other terminal of the transformer winding. The primary of transformer $T_2$ is maintained energized from the alternating current source. As soon as the motor has operated to open the steam distribution valve 12 to admit steam from the steam main 11 to the heating radiator system 10 for zone A, the limit switch 42 opens to deenergize the motor 14.

Whenever the steam distribution valve 12 is opened to admit heat to zone A as just described, the two intermediate contacts 43 and 44 of the electromagnetic switch 30 each complete the running circuit R—W to start operation of the corresponding oil burner mechanisms of boiler furnaces 21 for zone A. As a result combustion is started to raise steam in each of the boiler furnaces. As the water is always maintained just below the steaming temperature steam is soon supplied from each of the furnaces 21 for zone A to the steam main 11 and thence through the open steam distribution valve 12 to the radiator system 10 for zone A.

In case any of the oil furnaces $F_3$ to $F_{10}$ for the other zones B, C, or D are operating at the time valve 12 is open, steam immediately will be supplied from the steam main 11 to the radiator system 10 of zone A even before steaming temperature may be reached in the oil furnaces $F_1$ and $F_2$ for zone A.

When the heating action of the steam radiator system 10 has raised the temperature of zone A above the value at which the zone thermostat 13 is set to maintain, the blade of the thermostatic switch 13 engages with its right-hand contact $S_a$ to effect the closure of the valve 12 and the stopping of the oil furnaces $F_1$ and $F_2$ normally supplying heat to zone A. The engagement of the thermostatic switch with the contact $S_a$ forms a short circuit around the winding of the master control switch 30 thereby deenergizing said switch. When switch 30 opens the contact 35 interrupts the holding circuit from the secondary winding 32 of the transformer. Also at the same time the contact 36 of switch 30 returns into engagement with its lower cooperating contact thereby energizing motor 14 from the secondary winding 40 of the transformer $T_2$ through a circuit including the limit switch 45. When the motor 14 has operated the valve 12 to the closed position to cut off further supply of steam to radiators 10 the limit switch 45 opens to deenergize the motor.

As a result of the opening of electromagnetic switch 30, contacts 43 and 44 return into engagement with their respective lower contacts, thereby completing the stop circuits W—S for deenergizing the electrically controlled oil burner mechanism of the furnaces $F_1$ and $F_2$ for zone A.

During operation of the radiator heating system 10 in zone A, the steam condenses in the radiator 10 and drains back through the valve 12 into the steam header 11 and thence returns to the common condensate return pipe 27 which is connected to each of the boiler furnaces $F_1$ to $F_{10}$ for all of the zones. The usual type of boiler return trap line around valve 12 may be provided if desired.

The heat generating and distributing equipments for the zones B, C, and D operate in substantially the same manner as just described. In the case of zone B two zone thermostats $13b_1$ and $13b_2$ are shown for jointly controlling the operation of the master control electromagnetic switch 30b. This enables more uniform temperature conditions to be maintained in zone B as the two thermostats may be located in different parts of the zone. The two thermostats $13b_1$ and $13b_2$ are interconnected so that both thermostats must engage with their cooperating stop contact $Sb_1$ and $Sb_2$ in order to complete the short circuit for deenergizing the winding of switch 30b. However, with either thermostat in its stop position, the other thermostat can engage with its corresponding running contact $Rb_1$ or $Rb_2$ to energize the electromagnetic switch 30b and thereby effect operation of the heat generating and distributing equipment to supply heat to the zone. Hence this connection arrangement insures that the ambient temperature of both of the thermostats $13b_1$ and $13b_2$ must be above the value which they are set to maintain before the heating of zone B is stopped but either thermostat can start the heating of zone B when the ambient temperature thereof falls. When any one of the master control electromagnetic switches 30b, 30c, or 30d is closed by operation of the corresponding zone thermostat, the oil furnaces comprising the heat generating equipment for the corresponding zone is started into operation at the same time the corresponding zone heat distributing valve is opened to admit steam to the zone radiator system from the steam main 11. The energization of the master control electromagnetic switches, the energization of the valve control motors and the energization of each oil furnace is accomplished in substantially the same manner as previously described. In case any zone thermostat calls for heat during the time that the heat generating equipment for another zone is in operation as occurs most frequently in severe heating service steam is immediately available from the steam main 11.

In the modified arrangement shown in Fig. 2, provision is made for starting into operation in conjunction with the heat generators for each of the zones $A_1$, $B_1$, $C_1$ and $D_1$ all or a portion of the heat generators for another zone whenever the steam pressure in the steam main 11 is below a predetermined minimum value. This is accomplished by means of a special interlocking connection arrangement which upon operation of the master control electromagnetic switch of any zone places all or a portion of the heat generators of another zone under the control of a pressure switch responsive to steam pressure in the steam main 11. Thus when heat is required in any zone and the pressure in the steam main 11 is below the minimum predetermined value, the steam generating capacity available for each zone is automatically increased. This insures a rapid and adequate supply of heat to the radiator equipment of the zone in which the heat is required.

The zone thermostats 50, 51, 52, and 53, the electromagnetic master control switches 54, 55, 56, and 57, the electric motor operated steam admission valves 58, 59, 60, and 61 and the groups of oil fired boiler furnaces $F_1$—$F_2$, $F_3$—$F_4$—$F_5$, $F_6$—$F_7$ and $F_8$—$F_9$—$F_{10}$ of the zones $A_1$, $B_1$, $C_1$, and $D_1$, as shown in Fig. 2, all operate in substantially the same manner as described in connection with Fig. 1. However, as illustrated in Fig. 3 and shown in detail in Fig. 4, the control electromagnet 24 for the electrically operated oil burner mechanism of each furnace $F_1$ to $F_{10}$ is energized by means of a simplified two-wire control instead of the three-wire control shown in Fig. 3. In this two-wire control the burner control electromagnet 24 of each furnace is energized directly from the supply lines $L_1$ and $L_2$ upon operation of the master control switch. The burner mechanism is energized through switch 23 to establish combustion when the energizing circuit for the electromagnet 24 is established and the burner mechanism is stopped when the circuit for electromagnet 24 is opened. The boiler water thermostat 25 operates switch 23 to start and stop the burner mechanism to maintain the water just below the steaming temperature in the same way as in Fig. 3.

When the thermostat 50 of zone $A_1$ calls for heat, the master control electromagnetic switch 54 is energized and operates all of its contacts 70, 71, 72 and 73 from the position in which they are shown to their upper position. Contact 70 serves to energize the electric motor operated valve 58 to open the valve and admit steam into the radiator system 10. At the same time contacts 72 and 73 establish energizing circuits from the line $L_1$ through conductors 74 and 75 in parallel circuit to the control electromagnets 24 of the furnaces $F_1$ and $F_2$ to line $L_2$. These furnaces thereupon start to supply steam to the steam main 11 in substantially the same manner as previously described.

Upon the closure of contact 71 of switch 54, an energizing circuit for starting operation of the burner mechanisms of the furnaces $F_3$ and $F_4$ of zone $B_1$ is also established whenever the pressure responsive switch 76 is in the circuit closing position. Switch 76 is operated responsively to the pressure in the steam main 11 and is maintained in the circuit closing position whenever the steam pressure falls below a predetermined value.

The energizing circuit controlled by the switch contact 71 may be traced from the supply line $L_1$ through conductor 77, the contacts of pressure switch 76, conductor 78, switch contact 71, conductor 79 and thence in parallel circuit through the switch contacts 90 and 91 and the control electromagnet 24 of furnaces $F_3$, $F_4$ to the supply line $L_2$.

Under these conditions the four oil furnaces $F_1$, $F_2$, $F_3$, $F_4$ are started into operation concurrently when the pressure switch 76 is closed. As soon as the pressure in the steam main 11 increases to the value required to operate the switch 76 to the open position, the control electromagnet 24 of the oil furnaces $F_3$, $F_4$ is automatically deenergized, thus leaving the furnaces $F_1$ and $F_2$ in operation to supply the normal heating requirements of zone $A_1$.

Whenever the thermostat 51 of zone $B_1$ calls for heat, the three furnaces $F_3$, $F_4$, $F_5$ are started into operation by energization through the contacts 90, 91, 92 in their upper positions. Contact 93 establishes a circuit extending through the pressure switch 76 in the closed position, conductor 78, conductor 94, and contacts 100 and 101 in their lower positions shown for energizing the control magnet 24 of the oil burner mechanism of furnaces $F_6$, $F_7$. When the pressure switch 76 is opened in response to increased pressure in the steam main 11, the furnaces $F_6$, $F_7$ are shut down.

In a similar way the contact 102 establishes an energizing circuit through the pressure switch 76 and the contacts 105 and 106 of electromagnetic switch 57 for starting the furnaces $F_9$ and $F_{10}$ into operation simultaneously with the furnaces $F_6$ and $F_7$ upon a call for heat by the thermostat 52 of zone $C_1$ when the pressure in the steam main 11 is below the predetermined value. In turn contact 107 of switch 57 serves to start operation of the furnaces $F_1$, $F_2$ simultaneously with the furnaces $F_8$, $F_9$ and $F_{10}$ upon a call for heat in zone $D_1$ with the pressure switch 76 closed.

In case the oil furnaces for any zone are operating under the automatic control of the pressure switch 76 when the thermostat for that zone calls for heat, all of the furnaces in the zone will continue in operation and the furnaces in some other zone will be started in case the pressure switch 76 remains closed.

While the automatic control of additional furnaces has been illustrated in Fig. 2 as under the control of pressure switch 76, it will be understood that a thermostatic switch responsive to the temperature of the steam main 11 may be employed if desired.

What I claim as new and desire to secure by Letters Patent of the United States, is:

1. The combination of a multiple zone distributing system for a heating medium having separately operable thermostatic means for controlling the admission of the heating medium to each zone to maintain a predetermined temperature therein, a plurality of heat generators for heating the medium, control means for operating a different predetermined portion of said heat generators upon operation of each of said thermostatic means to supply heating medium to the corresponding zone, and control means responsive to the condition of the heating medium for operating another portion of said heat generators when the heating medium varies from a predetermined condition upon operation of each of said thermostatic means to supply heating medium to the corresponding zone.

2. A multiple zone temperature control system including in combination, a common conduit for supplying a heat transfer medium to all said zones, a plurality of temperature changing devices, one for each zone and each adapted to vary the temperature of the heat transfer medium in said conduit, a plurality of medium distributing devices, one for each zone and each adapted upon operation thereof to supply medium from said conduit to the corresponding zone, and a thermostatic device in each zone for controlling the operation of the distributing and temperature changing devices corresponding to each zone to maintain a predetermined temperature condition within the corresponding zone, and control means responsive to a condition of the heat transfer medium for placing temperature changing devices other than those corresponding to a predetermined zone under the control of the thermostatic means in that predetermined zone.

WALTER O. LUM.